(12) United States Patent
Bahrs et al.

(10) Patent No.: US 10,430,600 B2
(45) Date of Patent: Oct. 1, 2019

(54) MECHANISMS FOR NEED TO KNOW AND LEAK AVOIDANCE

(71) Applicant: International Business Machines Corporation, Armonk, NY (US)

(72) Inventors: Peter C. Bahrs, Georgetown, TX (US); Marc Fiammante, St Laurent du Var (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 340 days.

(21) Appl. No.: 15/001,815

(22) Filed: Jan. 20, 2016

(65) Prior Publication Data

US 2017/0206370 A1 Jul. 20, 2017

(51) Int. Cl.
*G06F 21/62* (2013.01)
*G06F 21/60* (2013.01)

(52) U.S. Cl.
CPC ........ *G06F 21/6218* (2013.01); *G06F 21/602* (2013.01)

(58) Field of Classification Search
CPC .......................... G06F 21/6218; G06F 21/602
See application file for complete search history.

(56) References Cited

U.S. PATENT DOCUMENTS

| | | | | |
|---|---|---|---|---|
| 8,225,396 B1 * | 7/2012 | Gauvin | ................ | G06F 21/606 705/319 |
| 8,689,281 B2 | 4/2014 | Balinsky et al. | | |
| 8,909,925 B2 | 12/2014 | Baskaran | | |
| 9,063,897 B2 * | 6/2015 | Hamilton | ............ | G06F 12/1466 |
| 9,159,035 B1 * | 10/2015 | Ismael | ................. | G06N 99/005 |
| 9,450,945 B1 * | 9/2016 | Koeten | ................... | H04L 67/10 |
| 9,614,826 B1 * | 4/2017 | McCorkendale | ....... | H04L 63/08 |
| 9,684,773 B2 * | 6/2017 | Tuukkanen | ............. | G06F 21/14 |
| 10,079,835 B1 * | 9/2018 | Dodke | ................. | H04L 63/105 |
| 2006/0048224 A1 * | 3/2006 | Duncan | ................... | G06F 21/10 726/22 |

(Continued)

OTHER PUBLICATIONS

Balinsky "Intelligent Assistant for Context-Aware Policies," 2011 International Joint Conference of IEEE TrustCom, pp. 621-630 (Year: 2011).*

(Continued)

*Primary Examiner* — Luu T Pham
*Assistant Examiner* — James J Wilcox
(74) *Attorney, Agent, or Firm* — Cantor Colburn LLP; Scott Dobson

(57) ABSTRACT

A method for preventing the divulging information to an unauthorized requestor includes: receiving a request to view a data set, the receiving from a requestor; obtaining a policy associated with the data set; and determining a context for the requestor to view the data, the context including at least one of: information about the requestor, information about the data set, and conditions related to viewing the data set. The method further includes: applying the policy to the context; determining whether the context agrees with the policy; presenting the data set to the requestor based on the context agreeing with the policy; and preventing the data set from being presented to the requestor based on the context not agreeing with the policy.

18 Claims, 5 Drawing Sheets

(56) References Cited

U.S. PATENT DOCUMENTS

| | | | | |
|---|---|---|---|---|
| 2007/0022368 | A1* | 1/2007 | Bauchot | G06F 17/246 715/201 |
| 2007/0129966 | A1* | 6/2007 | Walker | G06Q 10/10 705/321 |
| 2007/0150299 | A1 | 6/2007 | Flory | |
| 2007/0297607 | A1* | 12/2007 | Ogura | G06F 21/606 380/239 |
| 2009/0178111 | A1* | 7/2009 | Moriconi | G06F 21/552 726/1 |
| 2011/0138223 | A1* | 6/2011 | Goldman | G06F 21/76 714/10 |
| 2011/0307486 | A1* | 12/2011 | Breslau | G06F 21/6245 707/737 |
| 2013/0205367 | A1* | 8/2013 | Sambamurthy | G06F 21/554 726/1 |
| 2013/0205410 | A1* | 8/2013 | Sambamurthy | G06F 21/554 726/28 |
| 2013/0294250 | A1* | 11/2013 | Berelejis | H04L 47/193 370/236 |
| 2014/0204174 | A1* | 7/2014 | Karimi-Cherkandi | H04N 21/4126 348/14.12 |
| 2015/0026817 | A1* | 1/2015 | Crowther | G06F 21/84 726/26 |
| 2016/0035233 | A1* | 2/2016 | Breed | G09B 7/00 345/8 |
| 2016/0328627 | A1* | 11/2016 | Fujii | G06F 21/6254 |
| 2017/0039387 | A1* | 2/2017 | Leonardi | G06F 21/6245 |
| 2017/0041296 | A1* | 2/2017 | Ford | H04L 63/0421 |
| 2017/0185752 | A1* | 6/2017 | Lemay | H04L 67/1097 |
| 2017/0316193 | A1* | 11/2017 | Manabe | G06F 21/32 |
| 2018/0025175 | A1* | 1/2018 | Kato | G08B 13/19613 713/153 |

OTHER PUBLICATIONS

Minami "Secure Context-Sensitive Authorization," Proceedings of the 3rd IEEE Int'l Conf. on Pervasive Computing and Communications, pp. 1-12 (Year: 2005).*

Miettinen "Towards Security Policy Decisions Based on Context Profiling," AlSec'10, Oct. 8, 2010, Chicago, Illinois, USA (Year: 2010).*

Cera, et al.; "Role-Based Viewing Envelopes for Information Protection in Collaborative Modeling"; Technical Report DU-CS-03-04 Department of Computer Science Drexel University Philadelphia, PA 19104; (2003); 24 pages.

Fokoue, et al.; "A Decision Support System for Secure Information Sharing"; Proceedings of the 14th ACM Symposium on Access Control Model and Technologies, SACMAT'09; Jun. 2009; ACM; (2009); 10 pages.

Jagadish, et al.; Prelusion of Locality Information Leaks and Secure Data Reclamation in Sensor Network using Homomorphic Encryption Algorithm;International Journal of Emerging Technology in Computer Science & Electronics (IJETCSE);(2015); 4 pages.

Li, et al.; "Scalable and Secure Sharing of Personal Health Records in Cloud Computing using Attribute-Bsaed Encryption"; IEEE Transactions on Parallel and Distributed Sytems; v.24, n.1; 2013; 14 pages.

Mostefaoui, et al.; A Generic Framework for Context-Based Distributed Authorizations; Springer-Verlag Berlin Heidelberg; (2003); 14 pages.

Pei-Wu, Li; "An Extended Model for Group-Centric Secure Information Sharing"; 2010 Third International Symposium on Electronic Commerce and Security; (2010); 4 pages.

Tchao, et al.; "SmartContent: A Self Protecting and Context-Aware Active Content"; 2012 IEEE Sixth International Conference on Self-Adaptive and Self-Organizing Systems Workshops (SASOW) IEEE; (2012); 6 pages.

* cited by examiner

MECHANISMS FOR NEED TO KNOW AND LEAK AVOIDANCE

BACKGROUND

Embodiments of the present invention relates to providing a commercially acceptable mechanism to inhibit, reduce or prevent leaks of information. Examples of information leaks are the disclosure of information such as in cloud documents to unauthorized release of a company's strategy.

SUMMARY

Disclosed in a method for preventing the divulging information to an unauthorized requestor. The method includes: receiving a request to view a data set, the receiving from a requestor via a processor; obtaining, by the processor, a policy associated with the data set; determining, by the processor, a context for the requestor to view the data, the context comprising at least one selection from a group consisting of information about the requestor, information about the data set, and conditions related to viewing the data set; applying, by the processor, the policy to the context; determining, by the processor, whether the context agrees with the policy; presenting, by the processor, the data set to the requestor based on the context agreeing with the policy; and preventing, by the processor, the data set from being presented to the requestor based on the context not agreeing with the policy.

Also disclosed is a system for preventing the divulging information to an unauthorized requestor. The system includes a memory having computer readable instructions and a processor for executing the computer readable instructions. The computer readable instructions include: receiving a request to view a data set, the receiving from a requestor; obtaining a policy associated with the data set; determining a context for the requestor to view the data, the context comprising at least one selection from a group consisting of information about the requestor, information about the data set, and conditions related to viewing the data set; applying the policy to the context; determining whether the context agrees with the policy; presenting the data set to the requestor based on the context agreeing with the policy; and preventing the data set from being presented to the requestor based on the context not agreeing with the policy.

Further disclosed is a computer program product for preventing the divulging information to an unauthorized requestor. The computer program product includes a computer readable storage medium having program instructions embodied therewith. The program instructions are executable by a processor to cause the processor to: receive a request to view a data set, the receiving from a requestor; obtain a policy associated with the data set; determine a context for the requestor to view the data, the context comprising at least one selection from a group consisting of information about the requestor, information about the data set, and conditions related to viewing the data set; apply the policy to the context; determine whether the context agrees with the policy; present the data set to the requestor based on the context agreeing with the policy; and prevent the data set from being presented to the requestor based on the context not agreeing with the policy.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein are directed to systems and methods to provide a commercially acceptable mechanism to inhibit, reduce or prevent leaks of information. Embodiments described herein inhibit, reduce or prevent a disgruntled employee or person intent of divulging information beyond the scope of legal or contractual agreement from doing so.

Figure 1:
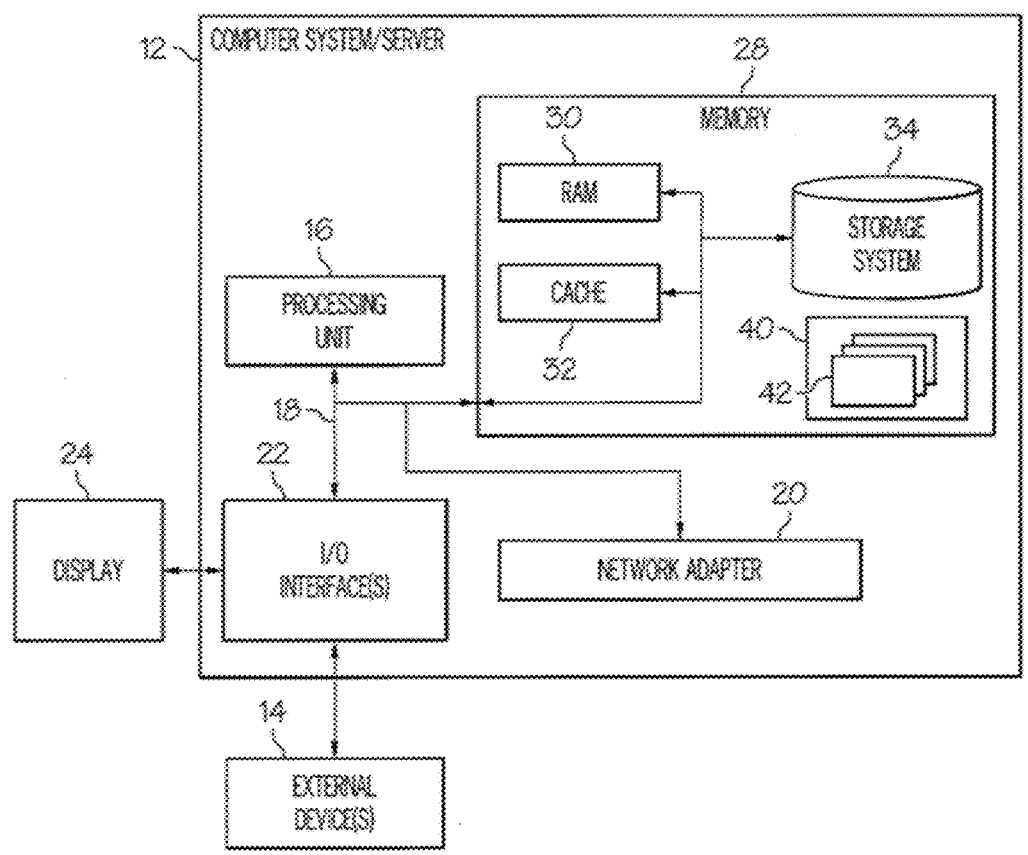
FIG. 1 illustrates a computer system according to an embodiment.

A computer system/server 12 for implementing methods disclosed herein is now discussed with reference to FIG. 1. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a camera, a microphone, an infrared (IR) sensor, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 2:
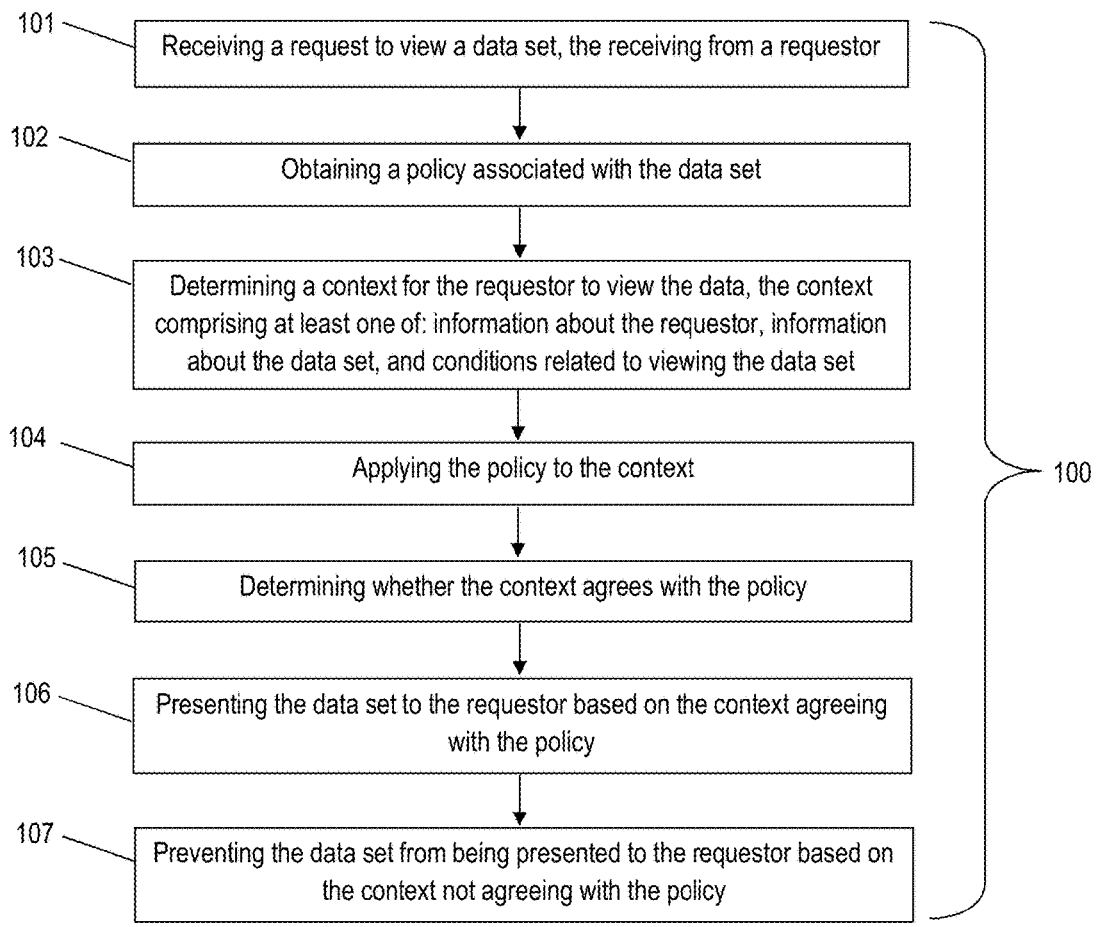
FIG. 2 is a flow chart for a method for preventing the divulging information to an unauthorized requestor.

FIG. 2 is a flow chart for a method 100 for preventing the divulging information to an unauthorized requestor. The term "unauthorized" relates to a person or organization that is not intended to receive a certain data set. In contrast, it is intended that an authorized person or authorized organization may view the certain data set if the authorized person or authorized organization requests it. In that an organization may possess many data sets, some being sensitive and not intended to be viewed by unauthorized persons or organizations and others having no restriction on who may view them, the possessing organization may label each data set not intended to be viewed by unauthorized persons or organizations with an identifier indicating such. Non-limiting examples of identifiers include "sensitive," "confidential," "authorized persons/organizations only," or similar. Non-sensitive data sets may be labelled as such or not labeled, where no label indicates that those data sets are not sensitive. Block 101 calls for receiving a request to view a data set, the receiving from a requestor via a processor. The requestor may be a person or a system. In one or more embodiments, the request is sent from a terminal or mobile device to a server (i.e., parent server or parent processor) owned by, controlled by, or dedicated to the organization owning or controlling the sensitive data set.

Block 102 calls for obtaining, by the processor, a policy associated with the data set. The term "policy" relates to rules or a rule set governing which persons or organizations can view the data set of interest and/or under what viewing conditions or context that the data set may be viewed. Non-limiting embodiments of the policy rules include: allowed (or approved) IP address of requestor, allowed GPS or geography location of requestor, allowed time of request, allowed date of request, allowed duration of viewing time, allowed movement of requestor while viewing, approved author of the data set, allowed number of pages in the data set, allowed person sending the request, allowed person viewing the data set, allowed list of people viewing the data set, whether the data set may be shared with others, required devices used to view the data set, whether a camera may be present and operable to view the requestor or background of the requestor, whether a visual filter is required, and/or whether a private certificate on a USB key is required. Other examples of policy elements are presented further below.

Block 103 calls for determining, by the processor, a context for the requestor to view the data, the context comprising at least one selection from the group consisting of information about the requestor, information about the data set, and conditions related to viewing the data set. Non-limiting embodiments of the (i) information about the requestor includes: person or system sending the request, IP address of requestor, GPS location of requestor, time of request, and/or date of request. Non-limiting embodiments of (ii) information about the data set includes: author of the data set, number of pages in the data set, and/or when the data set was produced. Non-limiting embodiments of (iii) the conditions related to viewing the data set includes: duration of viewing time, movement of requestor while viewing, person viewing the data set, list of people viewing the data set, whether the data set will be shared with others, whether a camera is present and operable, whether a visual filter is present, and/or whether there is a private certificate on a USB key. In one or more embodiments, the context may be obtained from the requestor by encapsulating the data set with code that instructs the terminal or mobile device of the requestor and any other viewers to send certain context information to the server of the organization owning or controlling the data set of interest. Basically, encapsulation is a layer on top of the content. It can be used to hide, assemble, or distort the content based on policy. For example, download PPTX file, and launch it, the encapsulation is an ad-on to PowerPoint that is launched and changes some of the behavior of PPT. Or, the encapsulation may be the actual displayer instead of PowerPoint or adobe PDF reader. The encapsulation layer or program can connect to the server, report context changes to the server, get changes to the policy from the server (continuous), access local devices such as camera, IR sensor, microphone, USB, keyboard. In one or more embodiments, context may be encapsulated as fragments such as XML Fragments that can optionally be encrypted using XML-encryption. Similarly, JSON fragments or other encapsulation methods can be used. The certain context information includes the context information required by the policy associated with the data set of interest. The code is written such that the data set of interest cannot be released or enabled for viewing until approval instructions are received from the parent server.

Block 104 calls for applying, by the processor, the policy to the context. In other words, this block determines whether the context of the requestor meets or satisfies the policy associated with the data set of interest.

Block 105 calls for determining, by the processor, whether the context agrees with the policy. That is, this block involves determining if the context agrees with the policy requirements for viewing the data set.

Block 106 calls for presenting, by the processor, the data set to the requestor based on the context agreeing with the policy. In one or more embodiments, this block may include sending instructions from the parent server to the terminal or mobile device of the requestor instructing the encapsulated data set to allow or enable the requestor to view the data set of interest. It is noted that applying context and downloading policies may be continuous and specified in the policy. For example, take a picture of the person viewing the content every minute, or whenever abnormal movement is detected take a picture, or other sounds heard, record, and send them to server. The policy may change based on too much movement, noise, IR detected metal, and turn off displays.

Block 107 calls for preventing, by the processor, the data set from being presented to the requestor based on the context not agreeing with the policy. Preventing may include pro-active actions such as requiring further actions before the data set is released or locking the data set to prevent its unauthorized release.

The method 100 may also include reporting or recording attempts by requestors to view the data set of interest by circumventing the implementation of applying the policy to context. The method 100 may also include reporting, recording, or displaying viewing alterations that are outside of what is allowed by the permutation filters. The method 100 may also include distributing visual cryptography image shares. Basically with visual cryptography, the content cannot be read or assembled without special glasses present. The method 100 may also include remotely causing the data set to be altered or erased upon command from the parent server. The command may be issued automatically by the parent server if the parent server detects that the context at present does not meet or satisfy the policy for the data set of interest. Alternatively, the command may be issued manually by a user monitoring the parent server when the user detects that the context at present does not meet or satisfy the policy for the data set of interest.

The method 100 may also include pushing any policy updates for a data set of interest into encapsulation when the data set of interest is requested.

In one or more embodiments, a sensitive data set of interest may be encapsulated with code at the parent server where the code contains the policy for the data set of interest. The code further includes instructions to request specific context information from the terminal or mobile device of the requestor. The code further includes instructions to receive the requested context. The code further includes instructions to apply the policy to the context received from the requestor using the processor at the terminal or mobile device level. The code further includes instructions to allow or enable the requestor to view the data set of interest if the received context meets or agrees with the policy. The code further includes instructions to not allow or enable the requestor to view the data set of interest if the received context does not meet or agree with the policy.

It can be appreciated that various combinations or a parent server or processor and a processor in the terminal or mobile device of the requestor may be used to implement the method 100. For example, the policy may be applied to the context locally by the processor at the terminal or mobile device and instructions related to block 105 and/or block 106 may be generated locally by the processor at the terminal or mobile device based upon the outcome of the applying.

Figure 3:
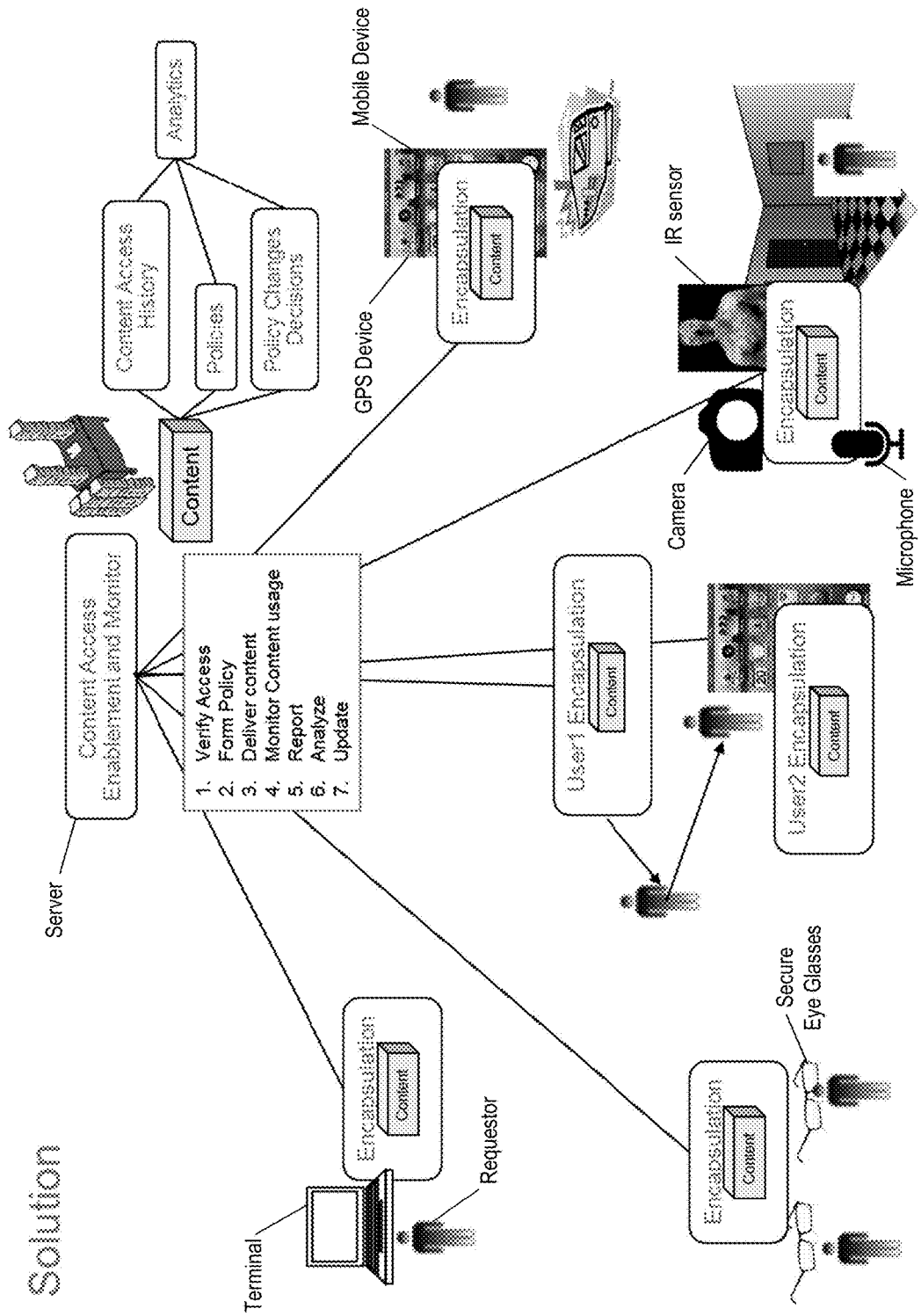
FIG. 3 depicts aspects of one example for implementing the method according to an embodiment.

FIG. 3 depicts aspects of one example for implementing the method 100. In the embodiment of FIG. 3, one requestor shares the data set of interest with another requestor. In this case, further encapsulation is implemented in order to ensure that the context of the other requestor satisfies the policy associated with the data set of interest. With reference to FIG. 3, content is created and it is packaged into an encapsulation. For example, content.PPTX or content.DOC, content.XML or content.json files would not exist, but rather content.Encapsulated would exist. Along with the content, a policy is created that applies to groups or individuals. The policy would vary, for example, for a user based on many of the contexts. For a person A, a policyA may apply for viewing in a secure room, policyB may apply for home office. The policy has information related to camera on/off, IR on/off, microphone on/off, movement threshold, noise threshold, GPS, GPS change rate (movement), time allowed, internet protocol address ranges allowed, duration of content validity, frequency to access server to report changes, frequency to access server to get policy updates, and assembly instructions. Assembly instructions, may be characterized as: display normal, hide/show pictures, hide/show text, show summary, show detail, blur image amount, delete sections, assemble to be viewable only by secure key exchange to special glasses. The encapsulated program applies the policy and determines how to assemble. This process can be continuous as there are "frequencies" in the policy on when to determine context change, and when to report back to server and get updated policy.

Other non-limiting examples of Policy are now presented.

IP: address+|address range+
   IP: 192.168.1.200, 192.168.1.*, 192.168.1.100-192.168.1.150
   From what IP addresses can content be accessed?

MAC: address+
   MAC: 88:88:99:99:11
   From what network MAC addresses/devices can content be accessed?

GPS: (coordinate/delta)+
   GPS: 30.22932894219517-97.71240234375/1
   From what GPS locations and expanded range can content be accessed?

Movement: (speed range)+
   Movement: 1-3 mph
   What movement ranges are allowed for viewing content?

Time: (time range)+
   Time: 0800-1000
   What time range is the content viewable? (related to date)

Date: (date range)+
   Date: 11.11.2015-11.12.2015
   What date ranges is the content viewable?

Delegate: group+|user+
   Delegate: Group2, User2
   Who is the user allowed to send the content to?

Route: IP+
   Route: list of IP addresses the content traverses
   Ranges injected into "header" of encapsulation/content-traceability Audio: users+|group+
  Audio: joe@joe2.com, SCs
    List of voices that are allowed, needed by analytics to processes, and recording device to capture.
Room: (+GPS:name)+
  Room: 30.2293287-97.712475: 5th Floor Room 23
    Room information, used by camera and IR scanner to capture setting, needed by analytics
Audio Rate: continuous|samples per minute
  Audio Rate: continuous
    Indicates how often the audio should be captured, stored and sent to the server for analytics processing when Policy Rate occurs
Image Rate: samples per minute
  Image Rate: 1
    Indicates how often camera images should be captured, stored and sent to the server for analytics processing when Policy Rate occurs
Video Rate: time range
  Image Rate: 1
    Indicates how often camera video should be captured, stored and sent to the server for analytics processing when Policy Rate occurs
IR Rate: continuous|samples per minute
  IR Rate: continuous
    Indicates how often IR scans should be captured, stored and sent to the server for analytics processing when Policy Rate occurs
Policy Rate: continuous|requests per hour
  Policy Rate: 30
    Indicates how often policy should be checked. Store information is sent to the server. A new policy and/or encapsulation/content is returned.
Assemble: User1+Image:50%
    Indicates how content is assembled for a user. Note, there is a case that multiple users with glasses are looking at same display but seeing different content
  Assemble: Group2+Text:Headlines
  Assemble: Group3+Image:Alternate1//present fake image
Combine: Policy Item & or |Policy Item
  Time: 22:00-23:00 & GPS: 37 23.516-122 02.625
  Allows policy attributes to be combined
Important to note, that the policy to encapsulate content can change based on Policy Rate. Changes to any of the attributes (e.g. IP, Audio Rate, Assemble) could be changed.
The policy y changes can be self-determined by encapsulation:
  For example, time range expires
The policy y changes can be analytics determined
  New voices detected
  Too many viewers of same content
  Email of content from one user to another
Each time policy is downloaded to encapsulated content
  In addition, new content may be downloaded. For example, in the case the analytics determines that a fraudulent usage is occurring when a user emails the content to a $2^{nd}$ user, a fake content may be downloaded to the $2^{nd}$ user.

Next, further aspects of embodiments of context and policy are discussed. In one or more embodiments, the context and policy provide to restrict viewing based on permutation filters. For example: person A can only view if person B and person C are also viewing; person A can only view if at IP address and person B is also viewing at the same IP address; person A can only view if person B observes person A on camera; and person A can only view using a pair of connected devices providing different shares of a visual cryptography split image. Many other permutation filters may be used depending on the data set and situation. In one example, after one minute or noise increase, stop displaying. Example, when movement stops (no longer in car listening to audio), stop displaying. Example, when other voices detected, only show summary information. Example, when more than one person detected, or metal detected, don't display. Real time analytics may be used to determine a policy change. For example, in a secure government room, there should be no other voices, so stop display if other voices are detected. Or, the voices can all be recognized to allow continuing of display—meaning all other people have same policy for same content. Similarly, when an IR scanner is used, analytics can take scanned results to determine what devices were seen (e.g., body scanner at airport, analytics would perform image processing to detect a camera or recording device or USB stick). Analytics may also determine that a similar pattern of access to the content was taking place by different people and stop display. For example, both people looking at content, paging at same pace, pausing at same pace. In this case, usage access to the content could be compared and alter the policy. In these cases, the policy may be changed in real time based upon analytics performed in real time.

Set forth below are some embodiments of the foregoing disclosure:

Embodiment 1: A method for preventing the divulging information to an unauthorized requestor, the method comprising: receiving a request to view a data set, the receiving from a requestor via a processor; obtaining, by the processor, a policy associated with the data set; determining, by the processor, a context for the requestor to view the data, the context comprising at least one selection from the group consisting of information about the requestor, information about the data set, and conditions related to viewing the data set; applying, by the processor, the policy to the context; determining, by the processor, whether the context agrees with the policy; presenting, by the processor, the data set to the requestor based on the context agreeing with the policy; and preventing, by the processor, the data set from being presented to the requestor based on the context not agreeing with the policy.

Embodiment 2: The method according to claim 1, further comprising identifying, by the processor, the data set with an identifier indicating that the data set should not be distributed to an unauthorized requestor.

Embodiment 3: The method according to claim 2, further comprising encapsulating, by the processor, the data set with the identifier with code that provides for sending context information from the requestor to the processor.

Embodiment 4: The method according to claim 3, wherein the encapsulated code is written to present the data set to the requestor based on the context agreeing with the policy and prevent the data set from being presented to the requestor based on the context not agreeing with the policy.

Embodiment 5: The method according to claim 3, wherein the code comprises the policy to be applied.

Embodiment 6: The method according to claim 5, wherein one of a terminal and mobile device of the requestor processes the code to apply the policy to the viewing context.

Embodiment 7: The method according to claim 1, wherein one of a server of an owner and controller of the data set comprises the policy.

Embodiment 8: The method according to claim 6, wherein the server applies the policy to the viewing context.

Embodiment 9: The method according to claim 1, wherein the policy comprises a permutation filter of a form, the requestor can only view the data set if a defined action occurs.

Embodiment 10: The method according to claim 1, wherein the method is implemented using a cloud computing environment.

Embodiment 11: A system for preventing the divulging information to an unauthorized requestor, the system comprising: a memory having computer readable instructions; and a processor for executing the computer readable instructions, the computer readable instructions comprising: receiving a request to view a data set, the receiving from a requestor; obtaining a policy associated with the data set; determining a context for the requestor to view the data, the context comprising at least one selection from the group consisting of information about the requestor, information about the data set, and conditions related to viewing the data set; applying the policy to the context; determining whether the context agrees with the policy; presenting the data set to the requestor based on the context agreeing with the policy; and preventing the data set from being presented to the requestor based on the context not agreeing with the policy.

Embodiment 12: The system according to claim 11, wherein the instructions further comprise encapsulating the data set with code that provides for sending context information from the requestor to one of a server of an owner and controller of the data set.

Embodiment 13: The system according to claim 12, wherein the policy is stored in the server and the server implements the applying.

Embodiment 14: The system according to claim 13, wherein the server sends instructions to one of a terminal and mobile device of the requestor to present the data set to the requestor based on the context agreeing with the policy and prevent the data set from being presented to the requestor based on the context not agreeing with policy.

Embodiment 15: The system according to claim 11, wherein the instructions further comprise encapsulating the data set with code that includes the policy and requires one of a terminal and mobile device of the requestor to obtain the context and apply the policy to the context.

Embodiment 16: The system according to claim 15, wherein the encapsulated code is written to present the data set to the requestor based on the context agreeing with the policy and prevent the data set from being presented to the requestor based on the context not agreeing with the policy.

Embodiment 17: The system according to claim 11, further comprising a cloud computing environment.

Embodiment 18: A computer program product for preventing the divulging information to an unauthorized requestor, the computer program product comprising a computer readable storage medium having program instructions embodied therewith, the program instructions executable by a processor to cause the processor to: receive a request to view a data set, the receiving from a requestor; obtain a policy associated with the data set; determine a context for the requestor to view the data, the context comprising at least one selection from the group consisting of information about the requestor, information about the data set, and conditions related to viewing the data set; apply the policy to the context; determine whether the context agrees with the policy; present the data set to the requestor based on the context agreeing with the policy; and prevent the data set from being presented to the requestor based on the context not agreeing with the policy.

Embodiment 19: The computer program product according to claim 18, wherein one of a server of an owner and controller of the data set: stores the policy; receives the context from one of a terminal and mobile device of the requestor using code that encapsulates the data set; sends instructions to one of the terminal and mobile device to present the data set to the requestor based on the context agreeing with the policy; and sends instructions to one of the terminal and mobile device to prevent the data set from being presented to the requestor based on the context not agreeing with the policy.

Embodiment 20: The computer program product according to claim 18, wherein one of a server of an owner and controller of the data set: stores the policy; encapsulates the data set with code that includes the policy and requires one of a terminal and mobile device of the requestor to apply the policy to the viewing context; and sends the encapsulated data set to one of the terminal and mobile device; wherein the code further requires one of the terminal and mobile device to present the data set to the requestor based on the context agreeing with the policy and prevent the data set from being presented to the requestor based on the context not agreeing with policy.

It can be appreciated that the method 100 or similar method for a software vendor proactively identifying problems a customer may have with software procured from the software vendor (or system for implementing the method 100 or similar method) may be implemented as a service (paid or otherwise) in a cloud computing environment as discussed in the following paragraphs.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
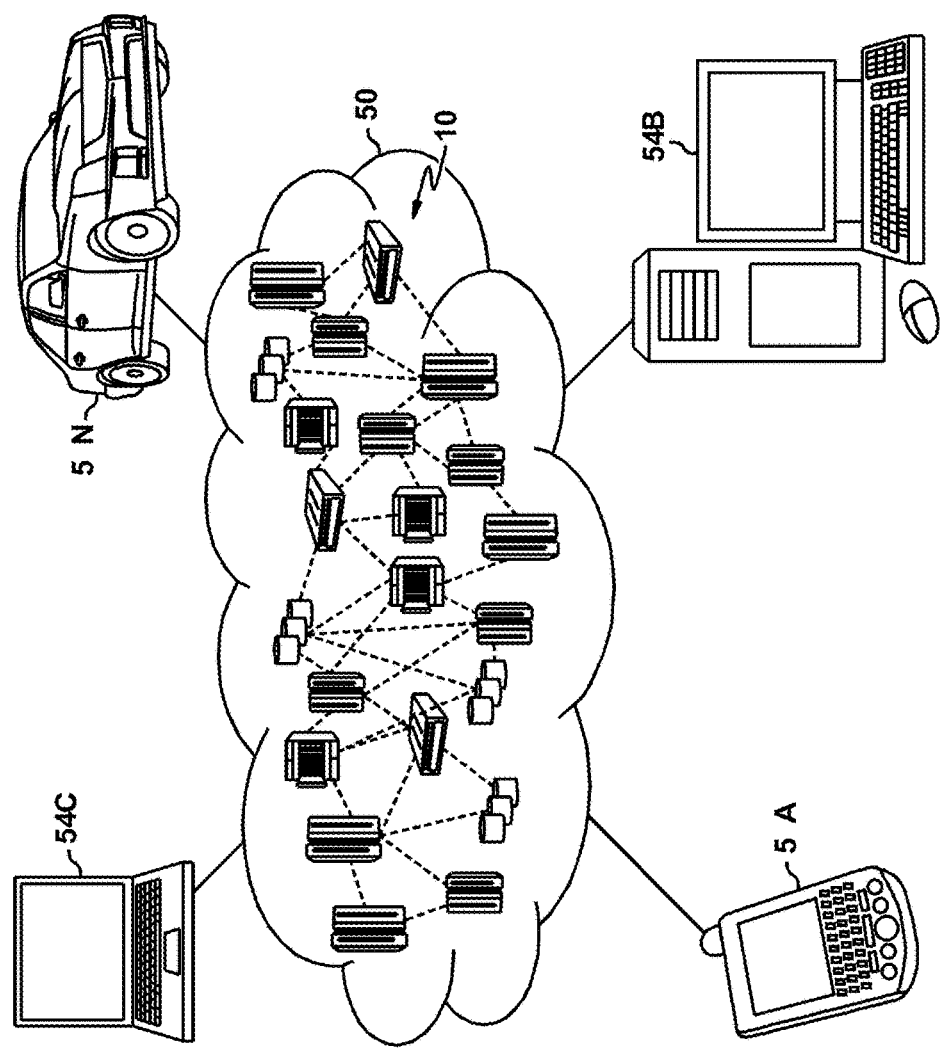
FIG. 4 depicts a cloud computing environment according to an embodiment.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
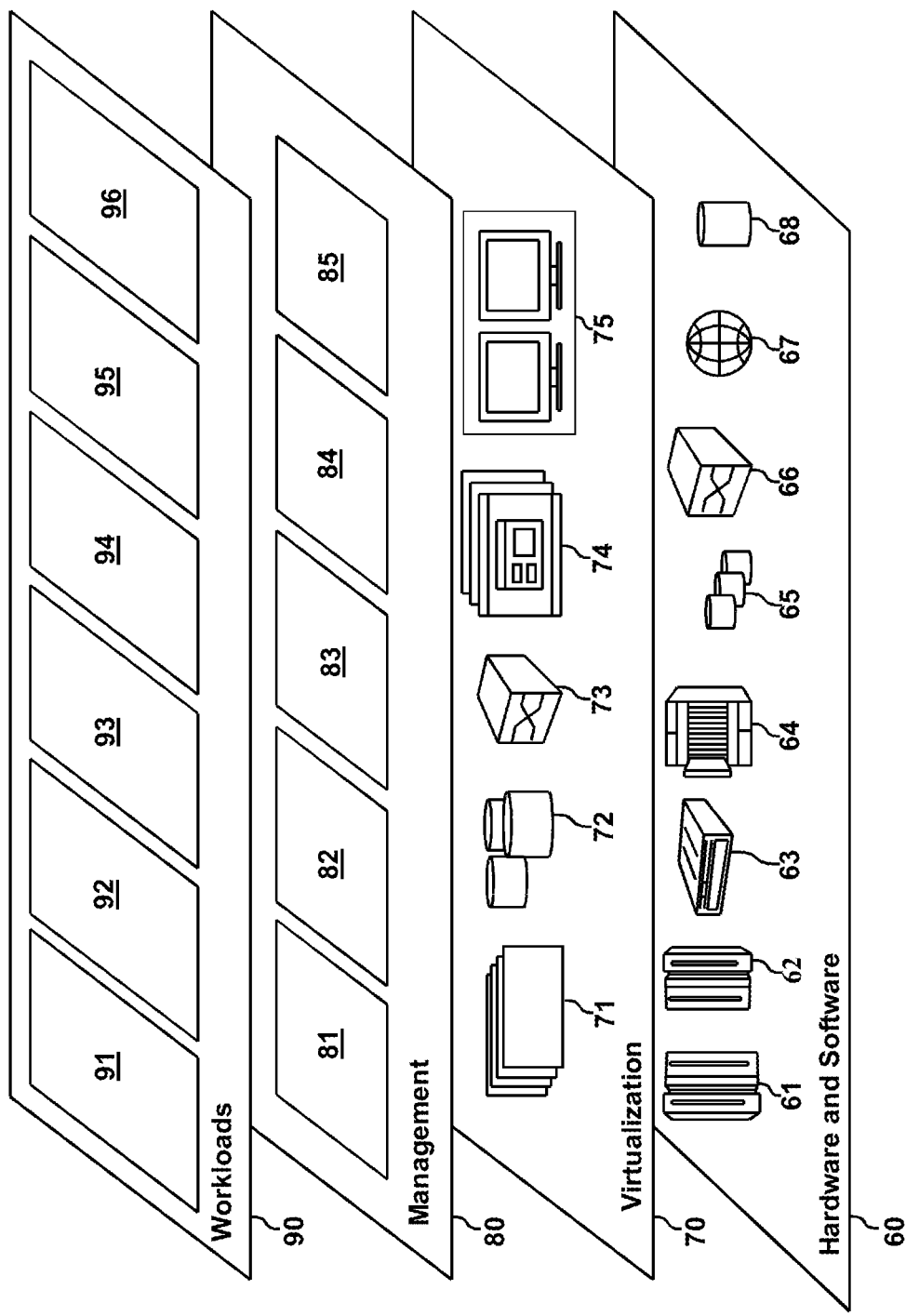
FIG. 5 depicts abstraction model layers according to an embodiment.

Referring now to FIG. 5, a set of functional abstraction layers provided by cloud computing environment 50 (FIG. 4) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a service 96 for inhibiting or preventing a person from divulging information to a non-authorized person or non-authorized organization.

Technical effects and benefits include preventing the divulging information to an unauthorized person. In one or more embodiments, a disgruntled employee or person intent on divulging information beyond the scope of legal or contractual agreement would be prevented from doing so.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "configured" relates to one or more structural limitations of a device that are required for the device to perform the function or operation for which the device is configured.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for preventing the divulging information to an unauthorized requestor, the method comprising:
   receiving a request to view a data set, the receiving from a requestor through a processor;
   identifying, by the processor, the data set with an identifier indicating that the data set should not be distributed to an unauthorized requestor;
   encapsulating, by the processor, the data set with the identifier with code that provides for sending context information from the requestor to the processor, the code comprising instructions to request specific context information from the requestor related to a condition for viewing the data set and instructions to receive the requested context information from the requestor, wherein the code is written to present the data set to the requestor based on the context information agreeing with the policy and prevent the data set from being presented to the requestor based on the context information not agreeing with the policy;
   obtaining, by the processor, a policy associated with the data set, wherein the policy comprises a permutation filter of a form such that the requestor can only view the data set if a defined action occurs, the defined action comprising at least one of (i) viewing by the requestor of the data set using multiple connected devices that display different shares of a visual cryptographic split image, (ii) presence of only one or more specific persons with the requestor, (iii) viewing the requestor on camera by a specific person, and (iv) monitoring an environment of the requestor using at least one of a camera, a microphone, and an infrared sensor;
   applying, by the processor, the policy to the context information;
   determining, by the processor, whether the context information agrees with the policy;
   presenting, by the processor, the data set to the requestor based on the context information agreeing with the policy; and
   preventing, by the processor, the data set from being presented to the requestor based on the context information not agreeing with the policy.

2. The method according to claim 1, wherein the code comprises the policy to be applied.

3. The method according to claim 2, wherein one of a terminal and mobile device of the requestor processes the code to apply the policy to the context information.

4. The method according to claim 3, wherein the server applies the policy to the context information.

5. The method according to claim 1, wherein one of a server of an owner and controller of the data set comprises the policy.

6. The method according to claim 1, further comprising a cloud computing environment.

7. A system for preventing the divulging information to an unauthorized requestor, the system comprising:
   a memory having computer readable instructions; and
   a processor for executing the computer readable instructions, the computer readable instructions comprising:
   receiving a request to view a data set, the receiving from a requestor;
   identifying the data set with an identifier indicating that the data set should not be distributed to an unauthorized requestor;
   encapsulating the data set with the identifier with code that provides for sending context information from the requestor to the processor, the code comprising instructions to request specific context information from the requestor related to a condition for viewing the data set and instructions to receive the requested context information from the requestor, wherein the code is written to present the data set to the requestor based on the context information agreeing with the policy and prevent the data set from being presented to the requestor based on the context information not agreeing with the policy;
   obtaining a policy associated with the data set, wherein the policy comprises a permutation filter of a form such that the requestor can only view the data set if a defined action occurs, the defined action comprising at least one of (i) viewing by the requestor of the data set using multiple connected devices that display different shares of a visual cryptographic split image, (ii) presence of only one or more specific persons with the requestor, (iii) viewing the requestor on camera by a specific person, and (iv) monitoring an environment of the requestor using at least one of a camera, a microphone, and an infrared sensor;
   applying the policy to the context information;

determining whether the context information agrees with the policy;

presenting the data set to the requestor based on the context information agreeing with the policy; and preventing the data set from being presented to the requestor based on the context information not agreeing with the policy.

8. The system according to claim 7, wherein the instructions further comprise encapsulating the data set with code that provides for sending the context information from the requestor to one of a server of an owner and controller of the data set.

9. The system according to claim 8, wherein the policy is stored in the server and the server implements the applying.

10. The system according to claim 9, wherein the server sends instructions to one of a terminal and mobile device of the requestor to present the data set to the requestor based on the context information agreeing with the policy and prevent the data set from being presented to the requestor based on the context information not agreeing with policy.

11. The system according to claim 7, wherein the instructions further comprise encapsulating the data set with code that includes the policy and requires one of a terminal and mobile device of the requestor to obtain the context information and apply the policy to the context information.

12. The system according to claim 11, wherein the encapsulated code is written to present the data set to the requestor based on the context information agreeing with the policy and prevent the data set from being presented to the requestor based on the context information not agreeing with the policy.

13. The system according to claim 7, further comprising a cloud computing environment.

14. The system according to claim 7, wherein the defined action further comprises at least one of (i) presence of only one or more specific persons with the requestor, (ii) viewing the requestor on camera by a specific person, and (iii) monitoring an environment of the requestor using at least one of a camera, a microphone, and an infrared sensor.

15. A computer program product for preventing the divulging information to an unauthorized requestor, the computer program product comprising a computer readable storage medium having program instructions embodied therewith, the program instructions executable by a processor to cause the processor to:

receive a request to view a data set, the receiving from a requestor;

identify the data set with an identifier indicating that the data set should not be distributed to an unauthorized requestor;

encapsulate the data set with the identifier with code that provides for sending context information from the requestor to the processor, the code comprising instructions to request specific context information from the requestor related to a condition for viewing the data set and instructions to receive the requested context information from the requestor, wherein the code is written to present the data set to the requestor based on the context information agreeing with the policy and prevent the data set from being presented to the requestor based on the context information not agreeing with the policy;

obtain a policy associated with the data set, wherein the policy comprises a permutation filter of a form such that the requestor can only view the data set if a defined action occurs, the defined action comprising at least one of (i) viewing by the requestor of the data set using multiple connected devices that display different shares of a visual cryptographic split image, (ii) presence of only one or more specific persons with the requestor, (iii) viewing the requestor on camera by a specific person, and (iv) monitoring an environment of the requestor using at least one of a camera, a microphone, and an infrared sensor;

apply the policy to the context information;

determine whether the context information agrees with the policy;

present the data set to the requestor based on the context information agreeing with the policy; and prevent the data set from being presented to the requestor based on the context information not agreeing with the policy.

16. The computer program product according to claim 15, wherein one of a server of an owner and controller of the data set: stores the policy; receives the context information from one of a terminal and mobile device of the requestor using code that encapsulates the data set; sends instructions to one of the terminal and mobile device to present the data set to the requestor based on the context information agreeing with the policy; and sends instructions to one of the terminal and mobile device to prevent the data set from being presented to the requestor based on the context information not agreeing with the policy.

17. The computer program product according to claim 15, wherein one of a server of an owner and controller of the data set: stores the policy; encapsulates the data set with code that includes the policy and requires one of a terminal and mobile device of the requestor to apply the policy to the context information; and sends the encapsulated data set to one of the terminal and mobile device; wherein the code further requires one of the terminal and mobile device to present the data set to the requestor based on the context information agreeing with the policy and prevent the data set from being presented to the requestor based on the context information not agreeing with policy.

18. The computer program product according to claim 15, wherein the defined action further comprises at least one of (i) presence of only one or more specific persons with the requestor, (ii) viewing the requestor on camera by a specific person, and (iii) monitoring an environment of the requestor using at least one of a camera, a microphone, and an infrared sensor.

* * * * *